United States Patent
Na et al.

(10) Patent No.: US 10,923,951 B2
(45) Date of Patent: *Feb. 16, 2021

(54) MAGNETIC INDUCTION POWER SUPPLY DEVICE

(71) Applicant: AMOSENSE CO., LTD, Cheonan-si (KR)

(72) Inventors: Won-San Na, Seoul (KR); Jin-Pyo Park, Seoul (KR); Jung-Hyun Choi, Gwangju-si (KR)

(73) Assignee: AMOSENSE CO., LTD, Cheonan-Si (KR)

(*) Notice: Subject to any disclaimer, the term of this patent is extended or adjusted under 35 U.S.C. 154(b) by 10 days.

This patent is subject to a terminal disclaimer.

(21) Appl. No.: 16/343,469

(22) PCT Filed: Oct. 19, 2017

(86) PCT No.: PCT/KR2017/011585
§ 371 (c)(1),
(2) Date: Apr. 19, 2019

(87) PCT Pub. No.: WO2018/074861
PCT Pub. Date: Apr. 26, 2018

(65) Prior Publication Data
US 2019/0280526 A1    Sep. 12, 2019

(30) Foreign Application Priority Data
Oct. 19, 2016    (KR) .................. 10-2016-0135845

(51) Int. Cl.
*H02M 7/06*    (2006.01)
*H02J 50/10*    (2016.01)
(Continued)

(52) U.S. Cl.
CPC ............. *H02J 50/10* (2016.02); *G05F 1/14* (2013.01); *H02J 3/36* (2013.01); *H02J 9/00* (2013.01);
(Continued)

(58) Field of Classification Search
CPC ... H02J 50/10; H02J 13/36; H02J 9/00; G05F 1/14; H02M 1/32; H02M 5/12; H02M 7/06; H02M 7/12; H02M 2001/007
See application file for complete search history.

(56) References Cited

U.S. PATENT DOCUMENTS 7,848,118 B2 * 12/2010 Shimada ............... H02M 1/32
                                                363/17
8,008,960 B2 *  8/2011 Arduini ............ H02M 3/33592
                                                327/280
(Continued)

FOREIGN PATENT DOCUMENTS

KR    2004-0081414 A    9/2004
KR    2009-0046439 A    5/2009
(Continued)

*Primary Examiner* — Dinh T Le
(74) *Attorney, Agent, or Firm* — CL Intellectual LLC (57) ABSTRACT

Disclosed is a magnetic induction power supply device, which switches the unit coil having the smallest number of windings to a rectification unit at the initial operation, thereby preventing the parts damaged due to an excessive inrush voltage. The disclosed magnetic induction power supply device switches the unit coil having the smallest number of windings to the rectification unit when emergency power is applied from a first power supply unit or a second power supply unit. The second power supply unit can supply the power source induced in the unit coils to a sensing unit as the emergency power.

9 Claims, 5 Drawing Sheets (51) Int. Cl.
*G05F 1/14* (2006.01)
*H02J 3/36* (2006.01)
*H02M 7/12* (2006.01)
*H02M 5/12* (2006.01)
*H02J 9/00* (2006.01)
*H02M 1/32* (2007.01)
*H02M 1/00* (2006.01)

(52) U.S. Cl.
CPC ............... *H02M 1/32* (2013.01); *H02M 5/12* (2013.01); *H02M 7/06* (2013.01); *H02M 7/12* (2013.01); *H02M 2001/0006* (2013.01); *H02M 2001/007* (2013.01)

(56) References Cited

U.S. PATENT DOCUMENTS

| | | | | |
|---|---|---|---|---|
| 9,398,651 | B2* | 7/2016 | Shrotriya | H05B 47/16 |
| 9,735,691 | B2* | 8/2017 | Wakabayashi | H02M 3/33546 |
| 2005/0276079 | A1* | 12/2005 | Park | H02M 3/33576 |
| | | | | 363/21.14 |
| 2020/0044483 | A1* | 2/2020 | Na | H01F 27/30 |

FOREIGN PATENT DOCUMENTS

| | | |
|---|---|---|
| KR | 2010-0090009 A | 8/2010 |
| KR | 2013-0097255 A | 9/2013 |
| KR | 2015-0000636 A | 1/2015 |
| WO | 2016/064725 A1 | 4/2016 |

\* cited by examiner

MAGNETIC INDUCTION POWER SUPPLY DEVICE

CROSS-REFERENCE TO RELATED APPLICATIONS

This application is a National Stage of International patent application PCT/KR2017/011585, filed on Oct. 19, 2017, which claims priority to foreign Korean patent application No. KR 10-2016-0135845, filed on Oct. 19, 2016, the disclosures of which are incorporated by reference in their entirety.

FIELD OF THE INVENTION

The present disclosure relates to a magnetic induction power supply device, and more particularly, to a magnetic induction power supply device, which produces power by using the magnetic induction phenomenon between a line and a current transformer to supply power to a load.

BACKGROUND

Recently, various types of magnetic induction power supply devices have been developed as the interest in a power supply method using the magnetic induction phenomenon increases.

The magnetic induction type power supply apparatus includes a current transformer. The current transformer is installed at a power line in which a large-capacity of current flows, such as a transmission line or a distribution line. The current transformer acquires power through the magnetic induction phenomenon. The magnetic induction type power supply apparatus converts the power acquired from the current transformer into DC to supply it to a load.

Since a conventional magnetic induction type power supply apparatus (hereinafter, referred to as a magnetic induction power supply device) is low in the amount of power that can be produced in a single current transformer, it is difficult to produce the power required when a low current flows through the line (i.e., power consumption).

To supplement this, a magnetic induction power supply device using a plurality of current transformers has been developed. The conventional magnetic induction power supply device converts the AC current produced in the plurality of current transformers into DC power and then supplies the sum thereof to the load.

For this purpose, the conventional magnetic induction power supply device includes a plurality of converters. The plurality of converters are connected one to one with the plurality of current transformers. The converter converts AC power produced in the current transformer to DC power.

There occurs loss in the conventional magnetic induction power supply device in the process of converting power in the converter (i.e., converting AC current into DC power). There is a problem in that the conventional magnetic induction power supply device reduces in the power acquisition efficiency due to the occurrence of loss.

In addition, there is a problem in that since the conventional magnetic induction power supply device requires the converter to be installed for each current transformer, the number of mounting parts increases, thereby increasing the installation cost and the maintenance cost.

In addition, there is a problem in that it is not possible for the conventional magnetic induction power supply device to produce the required power (power source) by the loss occurring in the process of inducing the current, which is equal to or lower than the reference, induced in the current transformer when a low current flows through the line and converting DC power.

In addition, there is a problem in that in the conventional magnetic induction power supply device, the parts are damaged by an inrush voltage having a high voltage generated at the initial operation.

The present disclosure is intended to solve the above conventional problems, and an object of the present disclosure is to provide a magnetic induction power supply device, which winds a plurality of coils having different number of windings from each other around a current transformer core and switches so that at least one coil thereof is connected in series to a rectification unit based on the voltage induced in the current transformer, thereby producing the power within the setting range even in a state where the voltage outside the reference is induced.

In addition, another object of the present disclosure is to provide a magnetic induction power supply device, which switches so that the unit coil having the smallest number of windings is connected in series to the rectification unit during the set time at the initial operation, thereby preventing the parts from being damaged due to an excessive inrush voltage at the initial operation.

For achieving the objects, a magnetic induction power supply device according to an embodiment of the present disclosure includes a current transformer installed at a power line to induce a voltage, and having a plurality of unit coils, a sensing unit configured to sense the voltage induced in the current transformer, a rectification unit configured to rectify the voltage induced in the current transformer, a switching unit configured to switch so that at least one among the plurality of unit coils is connected to the rectification unit based on the voltage sensed in the sensing unit, and a first power supply unit configured to supply emergency power to the sensing unit at the initial operation, and the sensing unit is configured to control the switching unit so that the unit coil having the smallest number of windings among the plurality of unit coils is connected to the rectification unit during the set time when the emergency power is applied from the first power supply unit.

According to the present disclosure, it is possible for the magnetic induction power supply device to switch so that at least one among the plurality of unit coils having different number of windings from each other is connected in series to the rectification unit according to the voltage induced in the power line, thereby regulating the power induction ratio according to a change in the current of the power line to provide a constant power to the load.

In addition, it is possible for the magnetic induction power supply device to switch so that the at least one among the plurality of unit coils having different number of windings from each other is connected in series to the rectification unit according to the voltage induced in the power line, thereby producing the power within the range required in the load even in a state where the current outside the reference (i.e., the current lower than the reference, the current exceeding the reference) is induced.

In addition, it is possible for the magnetic induction power supply device to switch so that the plurality of unit coils are connected in series to the rectification unit when the voltage induced in the power line is lower than the reference, thereby providing the power within the range required in the load even in a state where the voltage induced in the power line is low.

In addition, it is possible for the magnetic induction power supply device to switch so that the unit coil having the smallest number of windings among the plurality of unit coils is connected in series to the rectification unit when the voltage induced in the power line exceeds the reference, thereby supplying the power within the range required in the load even in a state where the voltage induced in the power line is excessive.

In addition, it is possible for the magnetic induction power supply device to induce a constant power even when the current of the power line changes to reduce the complexity or the capacity of the rectification unit, thereby easily implementing an optimum system, and reducing the manufacturing cost.

In addition, it is possible for the magnetic induction power supply device to switch with the unit coil having the minimum number of windings during the set time at the initial operation to reduce the inrush voltage of the high voltage occurring at the initial operation, thereby preventing the parts from being damaged by the inrush voltage.

In addition, it is possible for the magnetic induction power supply device to stabilize the input voltage, thereby reducing the voltage loss and increasing the power acquisition efficiency.

In addition, it is possible for the magnetic induction power supply device to control the switching unit according to the voltage induced in the power line to connect at least one among the plurality of unit coils in series, thereby enabling the efficient energy control in the normal operation section (i.e., the section in which the induced voltage is equal to or higher than the minimum reference voltage and is equal to or lower than the maximum reference voltage).

In addition, it is possible for the magnetic induction power supply device to allow the battery (i.e., the first power supply unit) to supply the emergency power to the sensing unit at the initial operation (re-operation) according to the power-recovery of the power line, thereby preventing the inrush voltage exceeding the maximum reference voltage upon the return (i.e., power-recovery) after the power outage of the power line from being applied to the rectification unit and preventing the element of the rectification unit from being damaged.

In addition, it is possible for the magnetic induction power supply device to rectify the voltage, which has been induced upon the power-recovery of the power line through the second power supply unit (i.e., the rectification circuit) when the first power supply unit (i.e., battery) fails, supplying to the sensing unit, thereby preventing the inrush voltage, which exceeds the maximum reference voltage upon the return (i.e., power-recovery) after the power outage of the power line even when the battery (i.e., the first power supply unit) fails, from being applied to the rectification unit and preventing the element of the rectification unit from being damaged.

In addition, it is possible for the magnetic induction power supply device to display and transmit the error (e.g., the failure of the first power supply unit) between the operations, etc. by using the emergency power of the second power supply unit when the first power supply unit fails, thereby easily performing the maintenance (i.e., quick response and maintenance to the error).

In addition, it is possible for the magnetic induction power supply device to detect the failure at all times of the core, the current transformer, the battery, the rectification circuit, etc. at the normal operation by applying the periodic emergency power through the first power supply unit and the second power supply unit.

DETAILED DESCRIPTION

Hereinafter, the most preferred embodiment of the present disclosure will be described with reference to the accompanying drawings so that those skilled in the art to which the present disclosure pertains can easily practice the technical spirit of the present disclosure. First, in adding reference numerals to the components in each drawing, it is to be noted that the same components are denoted by the same reference numerals even though they are illustrated in different drawings. In addition, in the following description of the present disclosure, a detailed description of known configurations or functions will be omitted when it is determined to obscure the subject matter of the present disclosure.

Figure 1:
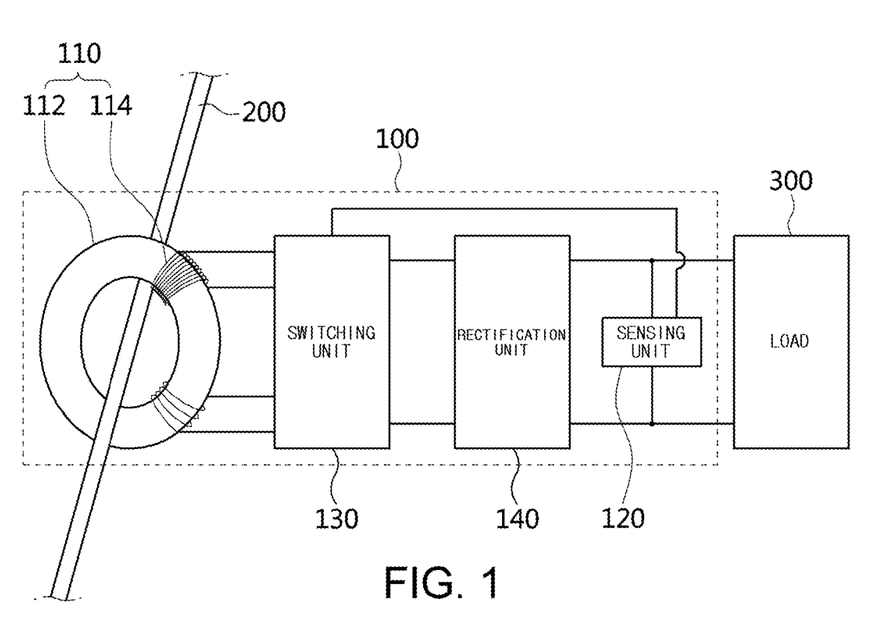
FIG. 1 is a diagram for explaining a magnetic induction power supply device according to an embodiment of the present disclosure.

Referring to FIG. 1, a magnetic induction power supply device 100 is configured to include a current transformer 110, a sensing unit 120, a switching unit 130, and a rectification unit 140.

The current transformer 110 is installed at a power line 200 through which a large-capacity of current flows to induce a voltage (or current, power) from the large-capacity of current flowing through the power line 200. The current transformer 110 is formed in a structure that can be detached from and attached to the power line 200, such as a clamp type. For example, the current transformer 110 divides a core 112 inside the current transformer 110 into two in order to be easily detached from and attached to the power line 200, thereby constituting an upper core and a lower core.

A plurality of unit coils 114 are wound around the core 112. At this time, at least two unit coils among the plurality of unit coils 114 are wound to have different number of windings from each other.

For example, the current transformer 110 is provided with the core 112, and a first unit coil 114a and a second unit coil 114b, which are configured to wind around the core 112, and to have different number of windings from each other. Herein, in order to easily explain the magnetic induction power supply device 100, although it has been described that the current transformer 110 includes the first unit coil 114a and the second unit coil 114b, it is not limited thereto and the current transformer 110 can also be configured to include three or more unit coils 114.

The core 112 is configured to include the upper core and the lower core. At this time, at least one of the upper core and the lower core is formed with the first unit coil 114a and the second unit coil 114b.

The first unit coil 114a is composed of a coil that winds around the core 112 in plural times. At this time, the surface of the first unit coil 114a can be coated with an insulating material.

The second unit coil 114b is composed of a coil that winds in plural times. The second unit coil 114b can be wound at the position different from the first unit coil 114a, or can be wound at the same position to be overlapped. At this time, the surface of the second unit coil 114b can be coated with an insulating material.

Meanwhile, the first unit coil 114a and the second unit coil 114b are formed to have a winding ratio of about 3:1. For example, when the first unit coil 114a is composed of a coil that winds around the core 112 150 times, the second unit coil 114b is composed of a coil that winds around the core 112 50 times.

At this time, both ends of the first unit coil 114a and the second unit coil 114b are connected to the switching unit 130.

The sensing unit 120 senses the voltage induced in the current transformer 110. At this time, the sensing unit 120 is connected in parallel with the rectification unit 140 to sense the voltage induced in the current transformer 110. The sensing unit 120 transmits the sensed voltage to the switching unit 130. Herein, the sensing unit 120 can also generate a switching signal based on the sensed voltage to transmit it to the switching unit 130.

Meanwhile, referring to FIG. 1, it can be understood that the sensing unit 120 is disposed between the rectification unit 140 and a load 300 to sense a constant voltage (i.e., a voltage supplied to the load).

However, the rectification unit 140 illustrated in FIG. 1 is a configuration of converting the voltage induced in the current transformer 110 into a DC voltage, and in the actual configuration, a DC-DC converter (not illustrated), which converts the DC voltage converted in the rectification unit 140 into the voltage required in the load, is disposed between the sensing unit 120 and the load 300.

Therefore, the voltage value sensed in the sensing unit 120 means the value of the DC voltage converted in the rectification unit 140 from the AC voltage induced in the current transformer 110.

On the other hand, although it has been illustrated in FIG. 1 that the sensing unit 120 is disposed between the rectification unit 140 and the load 300 to be connected in parallel with the rectification unit 140, it is not limited thereto and the sensing unit 120 is also disposed between the switching unit 130 and the rectification unit 140 to sense the value of the AC voltage (i.e., the voltage induced in the current transformer 110) applied through the switching unit.

The switching unit 130 switches so that at least one among the plurality of unit coils 114 is connected in series to the rectification unit 140 based on whether the magnetic induction power supply device 100 is at the initial operation and the voltage sensed in the sensing unit 120.

The switching unit 130 switches so that the unit coil 114 having the smallest number of windings among the plurality of unit coils 114 is connected in series to the rectification unit 140 during the set time (e.g., about 1 minute) at the initial operation of the magnetic induction power supply device 100.

That is, as the voltage that is equal to or higher than the maximum reference voltage is induced in the current transformer 110 at the initial operation of the magnetic induction power supply device 100, the elements for constituting the magnetic induction power supply device 100 or the elements for constituting the load 300 may be damaged.

Therefore, the switching unit 130 switches so that the unit coil 114 having the smallest number of windings among the plurality of unit coils 114 is connected in series to the rectification unit 140 during the set time at the initial operation, such that the voltage that is equal to or lower than the maximum reference voltage is applied to the rectification unit 140. At this time, when the voltage sensed in the sensing unit 120 is not present or the power of the magnetic induction power supply device 100 is turned off, the switching unit 130 can also set, as a default, to switch so that the unit coil 114 having the smallest number of windings is connected in series to the rectification unit 140.

Therefore, the switching unit 130 maintains the voltage applied to the rectification unit 140 at the voltage, which is equal to or lower than the maximum reference voltage, thereby preventing the elements constituting the magnetic induction power supply device 100 and the load 300 from being damaged.

The switching unit 130 switches so that at least one among the plurality of unit coils 114 is connected in series to the rectification unit 140 based on the voltage sensed in the sensing unit 120 after the set time has elapsed since the initial operation of the magnetic induction power supply device 100.

At this time, the switching unit 130 switches so that the plurality of unit coils 114 are connected in series to the rectification unit 140 when the voltage sensed in the sensing unit 120 is lower than the minimum reference voltage, thereby applying all voltages induced in the current transformer 110 to the rectification unit 140. Herein, the switching unit 130 can also switch so that some unit coils 114 (i.e., two or more) among the plurality of unit coils 114 are connected in series to the rectification unit 140, thereby applying the voltage that is equal to or higher than the minimum reference voltage to the rectification unit 140.

The switching unit 130 switches so that the unit coil 114 having the largest number of windings among the plurality of unit coils 114 is connected in series to the rectification unit 140 when the voltage sensed in the sensing unit 120 is equal to or higher than the minimum reference voltage and is equal to or lower than the maximum reference voltage, thereby applying the voltage induced in the unit coil 114 of the largest number of windings to the rectification unit 140.

The switching unit 130 switches so that the unit coil 114 having the smallest number of windings among the plurality of unit coils 114 is connected in series to the rectification unit 140 when the voltage sensed in the sensing unit 120 exceeds the maximum reference voltage, thereby applying the voltage induced in the unit coil 114 of the smallest number of windings to the rectification unit 140.

Figure 2:
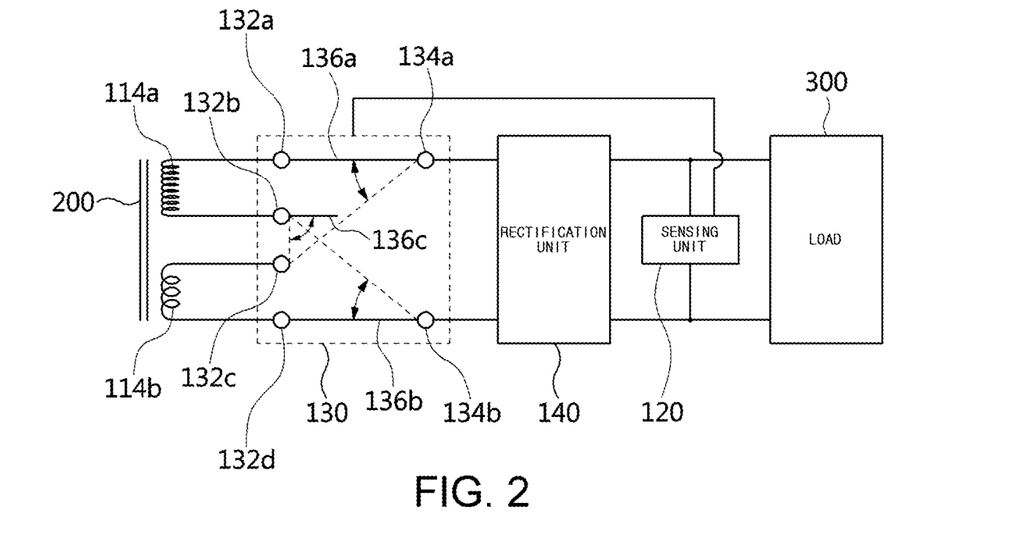
FIG. 2 is a diagram for explaining a sensing unit of FIG. 1.

As illustrated in FIG. 2, the current transformer 110 is composed of the first unit coil 114a and the second unit coil 114b that are spaced apart from each other and are wound around the core 112, and for example, when the first unit coil 114a has the number of windings higher than that of the second unit coil 114b, the switching unit 130 is configured to include a plurality of input terminals 132a to 132d connected to the first unit coil 114a and a second unit coil 114b, a pair of output terminals 134a, 134b connected to the rectification unit 140, and a plurality of divert switches 136a to 136c.

That is, the switching unit 130 can include a first input terminal 132a connected to one end of the first unit coil 114a, a second input terminal 132b connected to the other end of the first unit coil 114a, a third input terminal 132c connected to one end of the second unit coil 114b, and a fourth input terminal 132d connected to the other end of the second unit coil 114b.

The switching unit 130 can include a first output terminal 134a and a second output terminal 134b connected to two connection lines, respectively, connected to the rectification unit 140.

The switching unit 130 can include a first divert switch 136a for switching the first output terminal 134a to the first input terminal 132*a* or the third input terminal 132*c*, a second divert switch 136*b* for switching the second output terminal 134*b* to the second input terminal 132*b* or the fourth input terminal 132*d*, and a third divert switch 136*c* for switching the connection of the second input terminal 132*b* and the third input terminal 132*c*.

The switching unit 130 switches the connection of the input terminal and the output terminal based on the voltage induced in the current transformer 110 or whether the magnetic induction power supply device 100 is at the initial operation to connect at least one of the first unit coil 114*a* and the second unit coil 114*b* of the current transformer 110 to the rectification unit 140 in series.

Since the voltage that is lower than the voltage required in the load 300 is applied when the voltage induced in the current transformer 110 is lower than the minimum reference voltage, the voltages induced in the first unit coil 114*a* and the second unit coil 114*b* should be all applied to the rectification unit 140.

Figure 3:
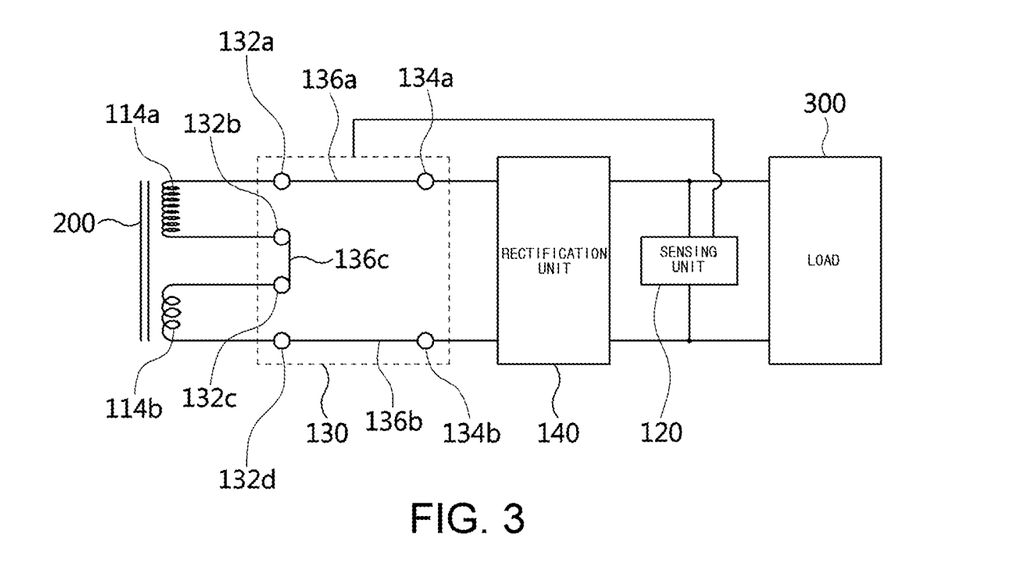
FIGS. 3 to 6 are diagrams for explaining a switching unit of FIG. 1.

Therefore, as illustrated in FIG. 3, the switching unit 130 switches the third divert switch 136*c* to connect the first unit coil 114*a* and the second unit coil 114*b* in series, switches so that the first divert switch 136*a* is connected to the first input terminal 132*a* and the first output terminal 134*a*, and switches so that the second divert switch 136*b* is connected to the fourth input terminal 132*d* and the second output terminal 134*b*, such that the first unit coil 114*a* and the second unit coil 114*b* are connected in series to the rectification unit 140.

Therefore, the voltage induced in the coil configured by connecting the first unit coil 114*a* and the second unit coil 114*b* in series is applied to the rectification unit 140.

Figure 4:
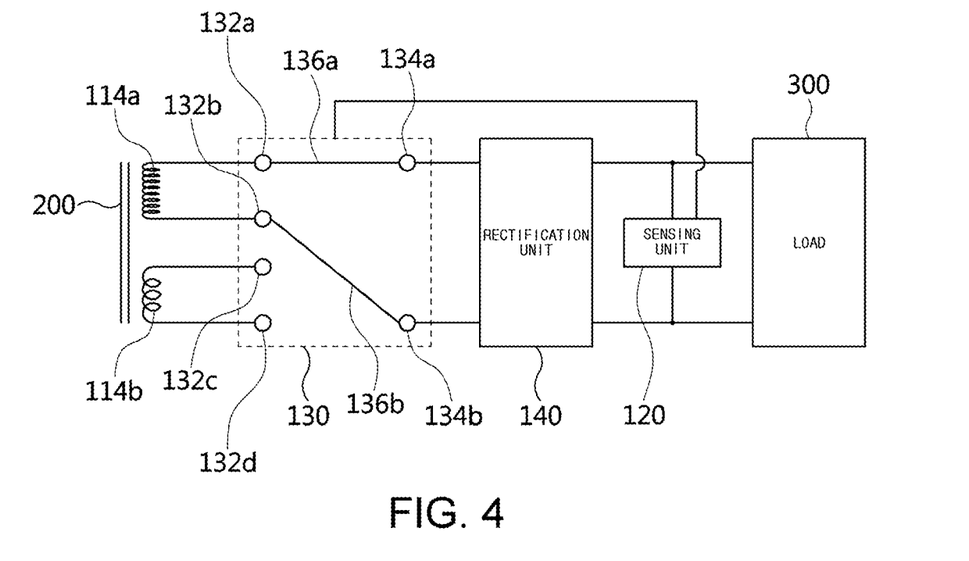

Meanwhile, when the voltage induced in the current transformer 110 is equal to or higher than the minimum reference voltage and is equal to or lower than the maximum reference voltage, the voltage within the voltage range required in the load 300 is applied to the rectification unit 140.

Therefore, as illustrated in FIG. 4, the switching unit 130 switches so that the first divert switch 136*a* is connected to the first input terminal 132*a* and the first output terminal 134*a*, and switches so that the second divert switch 136*b* is connected to the second input terminal 132*b* and the second output terminal 134*b*, thereby applying the voltage induced in the first unit coil 114*a* having the relatively large number of windings to the rectification unit 140.

Figure 5:
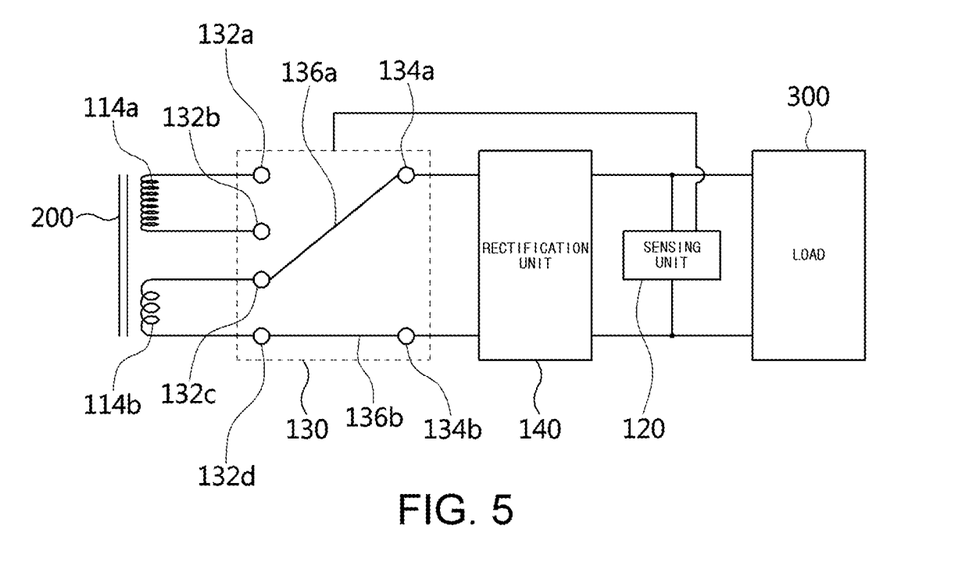

On the other hand, when the voltage induced in the current transformer 110 exceeds the maximum reference voltage, the element constituting the rectification unit 140 can be damaged.

Therefore, as illustrated in FIG. 5, the switching unit 130 switches so that the first divert switch 136*a* is connected to the third input terminal 132*c* and the first output terminal 134*a*, and switches so that the second divert switch 136*b* is connected to the fourth input terminal 132*d* and the second output terminal 134*b*, thereby applying the voltage induced in the second unit coil 114*b* having the relatively small number of windings to the rectification unit 140.

Figure 6:
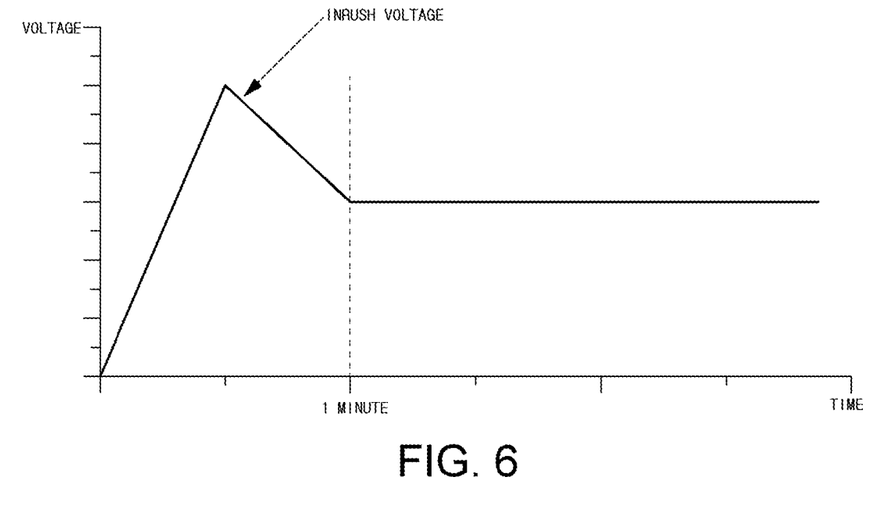

Meanwhile, referring to FIG. 6, when the inrush voltage exceeding the maximum reference voltage is applied at the initial operation of the magnetic induction power supply device 100, the element constituting the magnetic induction power supply device 100 or the load 300 can be damaged.

Therefore, the switching unit 130 switches so that the first divert switch 136*a* is connected to the third input terminal 132*c* and the first output terminal 134*a*, and switches so that the second divert switch 136*b* is connected to the fourth input terminal 132*d* and the second output terminal 134*b* during the set time at the initial operation of the magnetic induction power supply device 100, thereby applying the voltage induced in the second unit coil 114*b* having the relatively small number of windings to the rectification unit 140.

Therefore, the switching unit 130 can apply the voltage within the setting range to the rectification unit 140 regardless of the voltage induced in the current transformer 110, thereby preventing the element from being damaged.

The rectification unit 140 rectifies the voltage applied from the switching unit 130 through the connection lines to convert it into DC to supply it to the load 300. The rectification unit 140 can be composed of a full-wave rectification circuit or a half-wave rectification circuit composed of a plurality of diodes. The rectification unit 140 converts the voltage induced in at least one of the first unit coil 114*a* and the second unit coil 114*b* into DC according to the switching operation of the switching unit 130 to supply it to the load 300.

Figure 7:
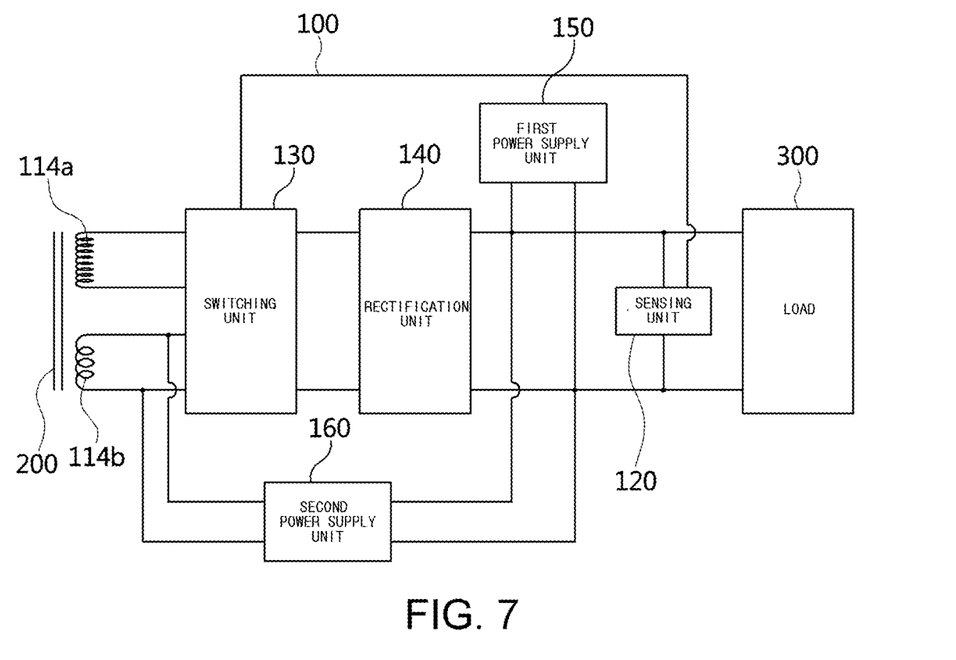
FIG. 7 is a diagram for explaining the magnetic induction power supply device according to an embodiment of the present disclosure.

Meanwhile, referring to FIG. 7, the magnetic induction power supply device 100 can further include a first power supply unit 150 for supplying emergency power for controlling the initial operation state of the switching unit 130 during the initial operation (or re-operation).

That is, since the inrush voltage exceeding the maximum reference voltage can be applied at the initial operation (or re-operation) according to the power-recovery after the power outage of the power line 200, the magnetic induction power supply device 100 should control the switching unit 130 to the initial operation state (see FIGS. 5 and 6).

However, since the magnetic induction power supply device 100 is operated by the voltage induced in the power line 200, there occurs the case that the magnetic induction power supply device 100 does not control the switching unit 130 to the initial operation state at the initial operation (or re-operation).

That is, since the sensing unit 120 for controlling the switching unit 130 is disposed at the rear end of the rectification unit 140, the sensing unit 120 operates only when a voltage is induced in the current transformer 110.

At this time, since the voltage induced in the current transformer 110 is applied to the sensing unit 120 through the switching unit 130 and the rectification unit 140, the inrush voltage is applied to the rectification unit 140 before a voltage is induced in the current transformer 110 to supply the power source to the sensing unit 120. Therefore, when the inrush voltage exceeding the maximum reference voltage is applied before the switching unit 130 is controlled to the initial operation state, the element constituting the rectification unit 140 can be damaged.

Therefore, the magnetic induction power supply device 100 further includes the first power supply unit 150 for supplying the emergency power for controlling the switching unit 130 to the sensing unit 120.

The first power supply unit 150 is composed of a battery, and supplies power to the switching unit 130 upon the power outage of the power line 200 to maintain the initial operation state. At this time, when the emergency power is supplied from the first power supply unit 150, the sensing unit 120 controls the switching unit 130 to the initial operation state. Therefore, the switching unit 130 switches so that the unit coil 114 having the relatively smallest number of windings among the plurality of unit coils 114 constituting the current transformer 110 is connected to the rectification unit 140 to maintain the initial operation state.

At this time, the first power supply unit 150 is connected between the rectification unit 140 and the sensing unit 120, and when the voltage is not induced due to the power outage of the power line 200, the first power supply unit 150 supplies power to the sensing unit 120 to control the switching unit 130 to the initial operation state.

Meanwhile, when the battery constituting the first power supply unit 150 fails, there occurs the case that the magnetic induction power supply device 100 does not control the switching unit 130 to the initial operation state at the initial operation (or re-operation).

Therefore, it is preferable that the magnetic induction power supply device 100 further includes a second power supply unit 160.

The second power supply unit 160 has one end connected to at least one of the first unit coil 114a and the second unit coil 114b, and has the other end connected between the rectification unit 140 and the sensing unit 120. At this time, the second power supply unit 160 is composed of a rectification circuit composed of a plurality of elements, and converts the AC voltage induced in the current transformer 110 to a DC voltage to apply it to the sensing unit 120. Herein, the second power supply unit 160 supplies power to the sensing unit 120 before the voltage applied from the current transformer 110 is applied to the rectification unit 140 through the switching unit 130. Therefore, the sensing unit 120 controls so that the switching unit 130 maintains the initial operation state.

Therefore, the magnetic induction power supply device 100 can prevent the inrush voltage exceeding the maximum reference voltage upon the return (i.e., the power-recovery) after the power outage of the power line 200 from being applied to the rectification unit 140 and prevent the element of the rectification unit 140 from being damaged.

As described above, although preferred embodiments of the present disclosure have been described, it is to be understood that they can be modified into various forms, and various modifications and changes thereof can be embodied by those skilled in the art without departing from the claims of the present disclosure.

The invention claimed is:

1. A magnetic induction power supply device, comprising:
   a current transformer attached to a power line to induce a voltage, and having a plurality of unit coils;
   a sensing unit configured to sense the voltage induced in the current transformer;
   a rectification unit configured to rectify the voltage induced in the current transformer;
   a switching unit configured to switch so that at least one among the plurality of unit coils is connected to the rectification unit based on the voltage sensed in the sensing unit; and
   a first power supply unit configured to supply emergency power to the sensing unit at an initial operation,
   wherein the sensing unit is configured to control the switching unit so that a unit coil having the smallest number of windings among the plurality of unit coils is connected to the rectification unit during a set time when the emergency power is supplied from the first power supply unit.

2. The magnetic induction power supply device of claim 1, wherein the first power supply unit is a battery.

3. The magnetic induction power supply device of claim 1, further comprising a second power supply unit configured to supply the emergency power to the sensing unit at the initial operation, wherein the second power supply unit configured to supply the power source induced from at least one among the plurality of unit coils to the sensing unit.

4. The magnetic induction power supply device of claim 3, wherein the second power supply unit is a rectification circuit composed of a plurality of diodes.

5. The magnetic induction power supply device of claim 3, wherein the second power supply unit configured to supply the emergency power, which has rectified the power source induced from at least one among the plurality of unit coils, to the sensing unit.

6. The magnetic induction power supply device of claim 1, wherein the switching unit configured to switch so that two or more among the plurality of unit coils are connected to the rectification unit when the voltage sensed in the sensing unit is lower than the minimum reference voltage.

7. The magnetic induction power supply device of claim 1, wherein the switching unit configured to switch so that the unit coil having the largest number of windings among the plurality of unit coils is connected to the rectification unit when the voltage sensed in the sensing unit is equal to or higher than the minimum reference voltage and is equal to or lower than the maximum reference voltage.

8. The magnetic induction power supply device of claim 1, wherein the switching unit configured to switch so that the unit coil having the smallest number of windings among the plurality of unit coils is connected to the rectification unit when the voltage sensed in the sensing unit exceeds the maximum reference voltage.

9. The magnetic induction power supply device of claim 1, wherein the current transformer comprises two or more unit coils having different number of windings from each other.

* * * * *